(No Model.) 5 Sheets—Sheet 1.
D. DI B. SAVORGNAN.
BICYCLE.
No. 578,269. Patented Mar. 2, 1897.
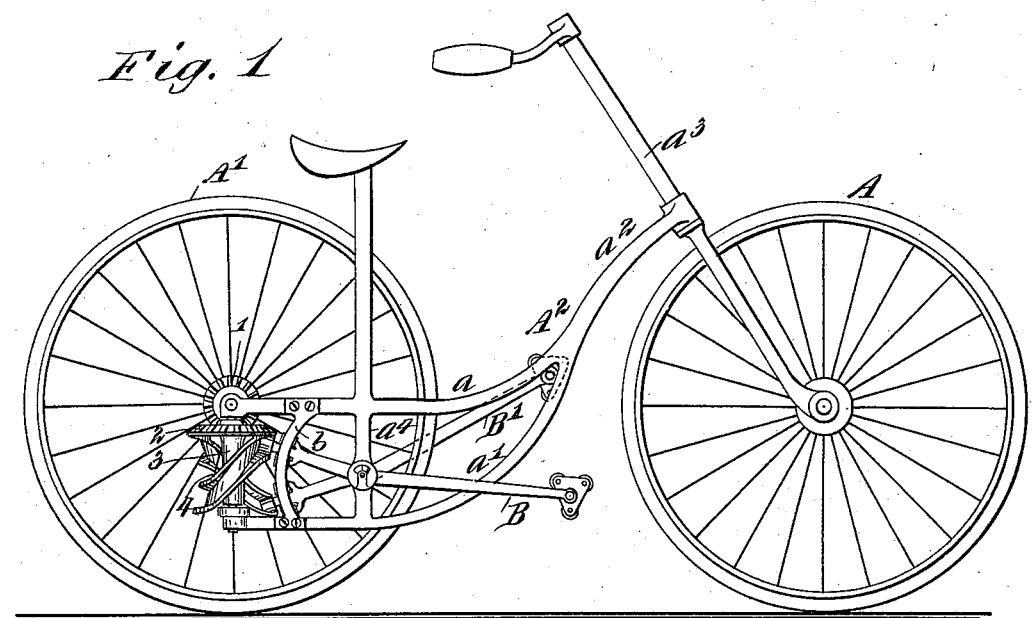
Fig. 1
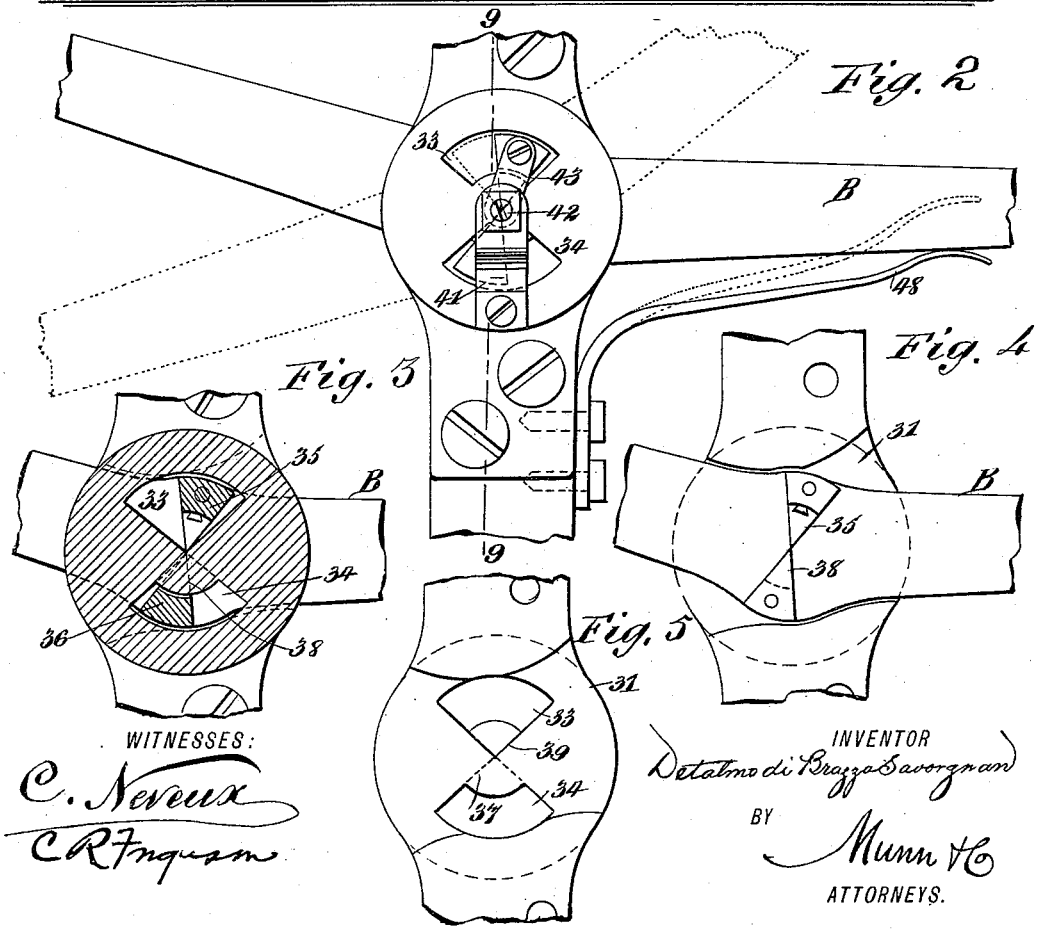
Fig. 2
Fig. 3
Fig. 4
Fig. 5
WITNESSES:
C. Neveux
C. R. Ingusan
INVENTOR
Detalmo di Brazza Savorgnan
BY
Munn & Co.
ATTORNEYS.

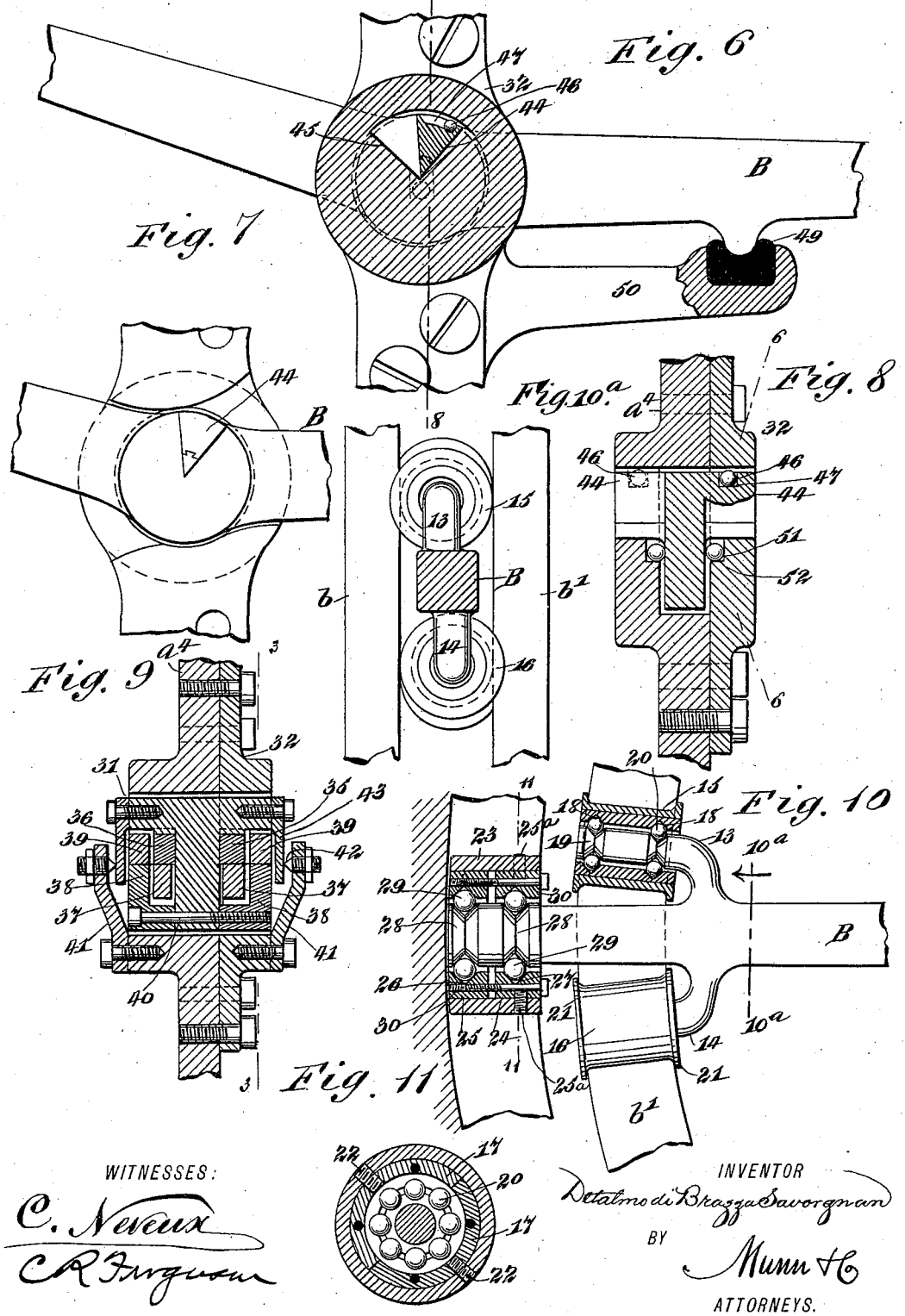

(No Model.) 5 Sheets—Sheet 3.
D. DI B. SAVORGNAN.
BICYCLE.
No. 578,269. Patented Mar. 2, 1897.
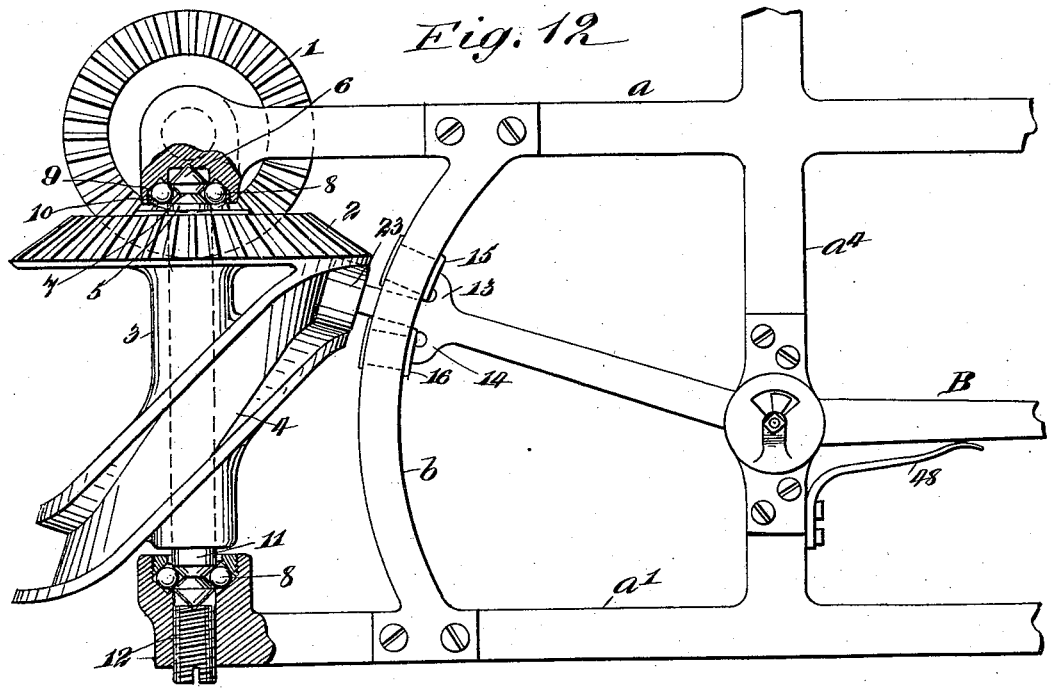
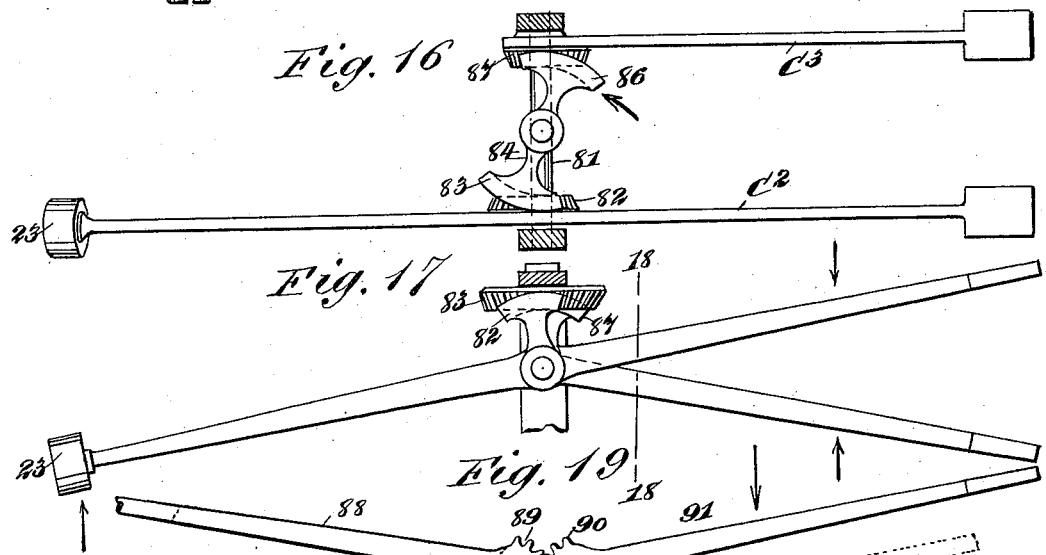
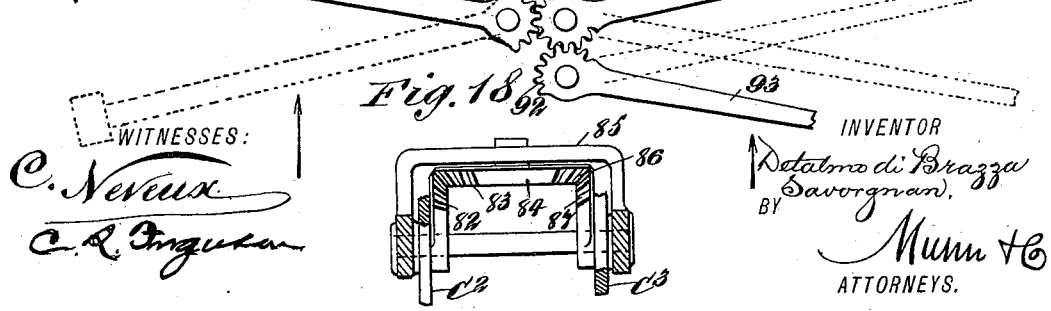

(No Model.) 5 Sheets—Sheet 4.
D. DI B. SAVORGNAN.
BICYCLE.
No. 578,269. Patented Mar. 2, 1897.
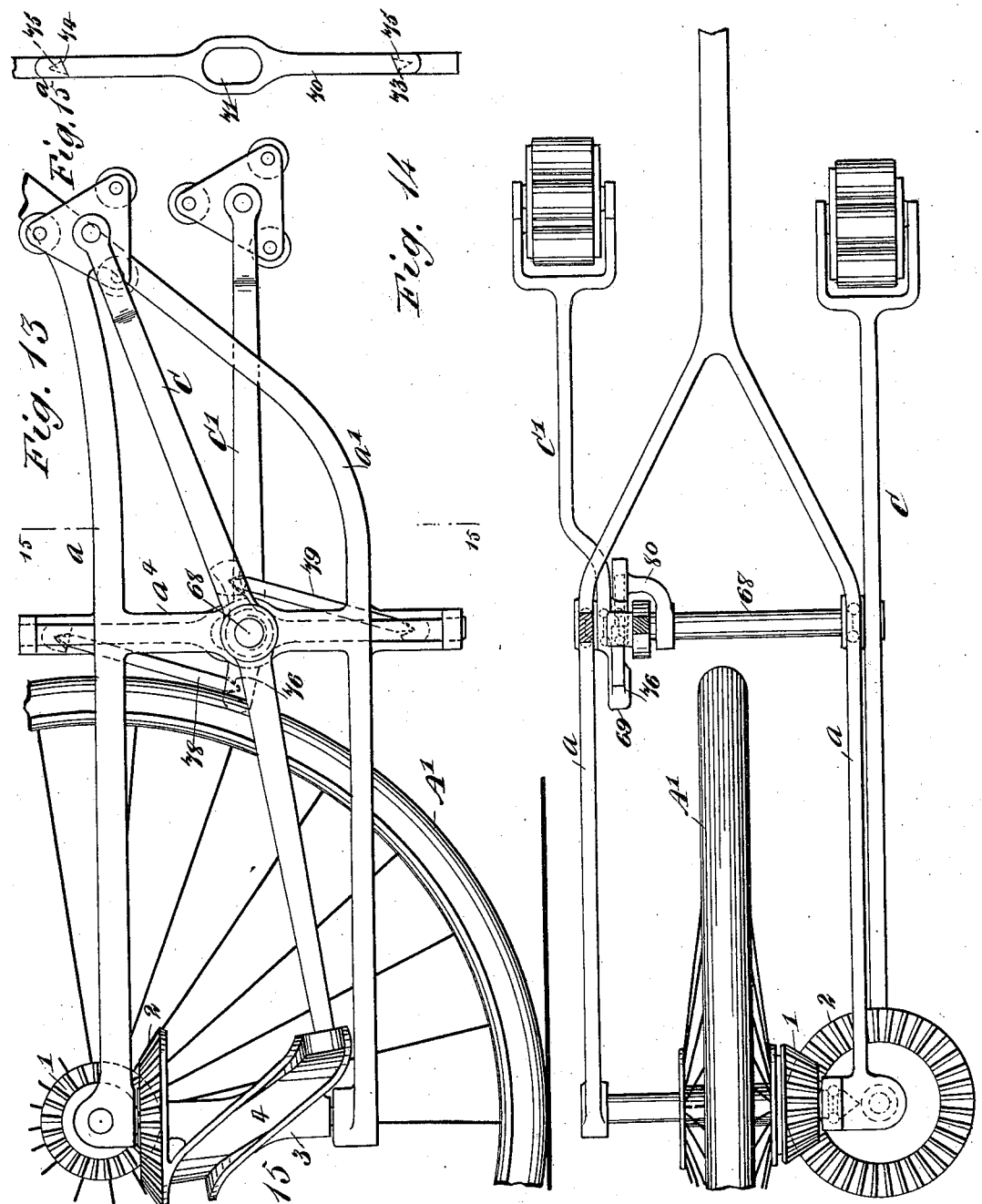
WITNESSES:
C. Neveux
C. R. Ferguson
INVENTOR
Detalmo di Brazza
Savorgnan
by Munn & Co.
ATTORNEYS.

(No Model.) 5 Sheets—Sheet 5.
D. DI B. SAVORGNAN.
BICYCLE.
No. 578,269. Patented Mar. 2, 1897.
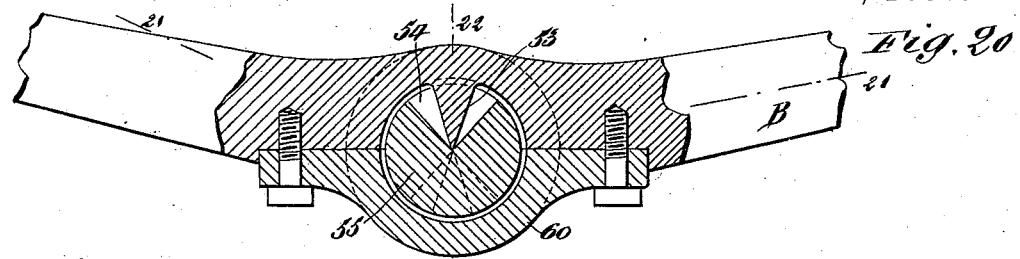
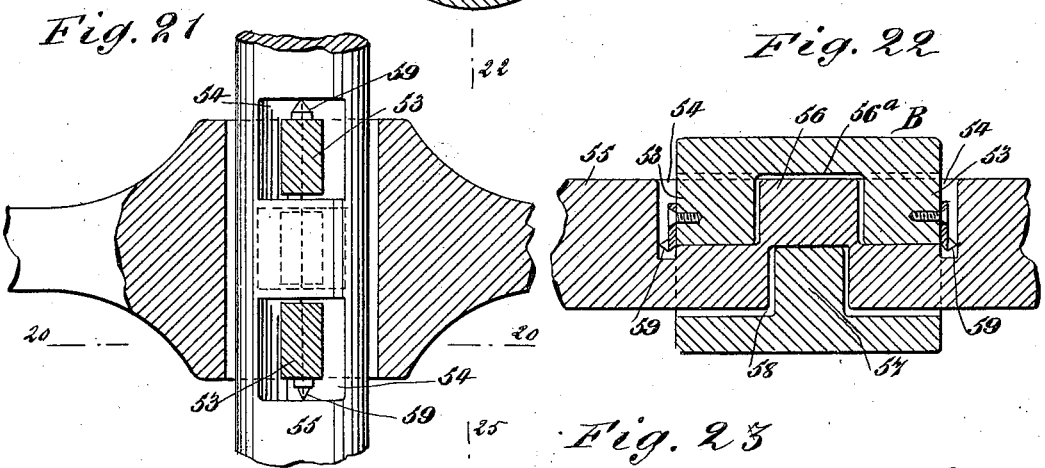
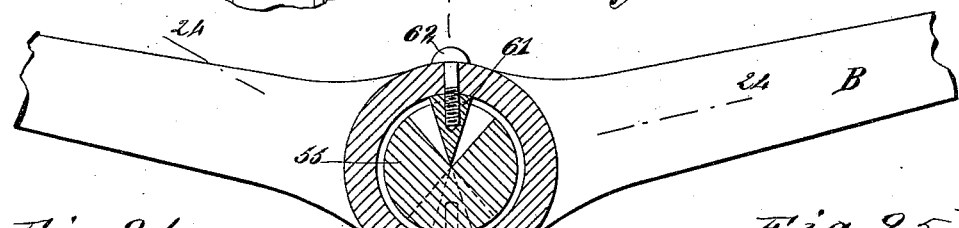
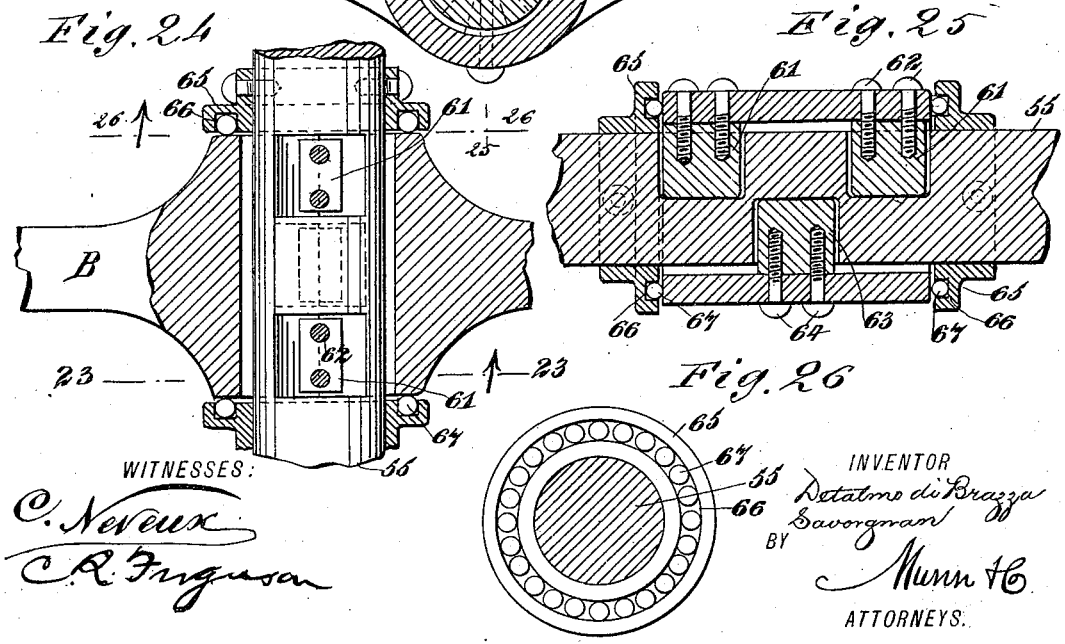
WITNESSES:
C. Neveux
C. R. Ferguson
INVENTOR
Detalmo di Brazza Savorgnan
BY Munn & Co
ATTORNEYS.

UNITED STATES PATENT OFFICE.

DETALMO DI BRAZZA SAVORGNAN, OF ROME, ITALY, ASSIGNOR TO CORA ANN SLOCOMB DI BRAZZA SAVORGNAN, OF MORUZZO, ITALY, AND NEW YORK, N. Y.

BICYCLE.

SPECIFICATION forming part of Letters Patent No. 578,269, dated March 2, 1897.

Application filed September 4, 1895. Serial No. 561,460. (No model.)

*To all whom it may concern:*

Be it known that I, DETALMO DI BRAZZA SAVORGNAN, of Rome, Italy, have invented new and useful Improvements in Bicycles, of which the following is a full, clear, and exact description.

This invention relates to bicycles or similar wheeled vehicles, and more especially to the driving mechanism therefor, the object being to reduce the friction of the working parts to a minimum.

The invention consists in the novel form of bearings, which will be hereinafter described, and particularly pointed out in the claims; and it further consists in the novel arrangement of parts, all as will further appear, and be pointed out in the claims.

Reference is to be had to the accompanying drawings, forming a part of this specification, in which similar characters of reference indicate corresponding parts in all the views.

Figure 1 is a side elevation of a bicycle embodying my invention. Fig. 2 is a side elevation, on a large scale, showing an operating-lever and the bearing connections therefor. Fig. 3 shows the same parts, partly in section, on the line 3 3 of Fig. 9. Fig. 4 is a side elevation of said parts with the side plate of the frame removed. Fig. 5 shows a portion of the frame with the lever and one side plate removed. Fig. 6 is a partial elevation and partial section on the line 6 6 of Fig. 8, illustrating a modification. Fig. 7 is a side elevation showing a portion of the frame and a portion of the lever having its bearing therein. Fig. 8 is a section on the line 8 8 in Fig. 6. Fig. 9 is a section on the line 9 9 of Fig. 2. Fig. 10 is a partial side elevation and partial section of an operating-lever and its connection with a guide and with a cam-block for driving the vehicle. Fig. 10$^a$ is a front view of the guides, partly in section, on the line 10$^a$ 10$^a$ in Fig. 10. Fig. 11 is a section on the line 11 11 of Fig. 10. Fig. 12 is a side elevation on a large scale, showing a cam-block and its bearing connections with the frame. Fig. 13 is a side elevation showing a modification of the driving mechanism. Fig. 14 is a plan view thereof. Fig. 15 is a partial elevation and a partial section on the line 15 15 of Fig. 13. Fig. 15$^a$ shows a shifting-rod employed in this modification. Fig. 16 shows another modified form of driving mechanism. Fig. 17 is a side elevation thereof. Fig. 18 is a section on the line 18 18 of Fig. 17. Fig. 19 is a side elevation showing still another modification. Fig. 20 shows another modified form of bearing for the operating-levers, the same being in section on the line 20 20 of Fig. 21. Fig. 21 is a section on the line 21 21 of Fig. 20. Fig. 22 is a section on the line 22 22 of Fig. 20. Fig. 23 is a section on the line 23 23 of Fig. 24, showing another modification. Fig. 24 is a partial plan and partial section on the line 24 24 of Fig. 23. Fig. 25 is a section on the line 25 25 of Fig. 23, and Fig. 26 is a section on the line 26 26 of Fig. 24.

Referring first to the example of my improvement embodied in Fig. 1, A designates the front or steering wheel of the bicycle, A′ the rear or power wheel, and A² the frame, comprising the rearwardly-extended side members $a$ $a'$, which are projected from the portion $a^2$, having connection with the front post $a^3$, within which the steering-rod operates. Vertical bars $a^4$ extend between the portions $a$ $a'$ at each side of the wheel A′.

The shaft of the driving-wheel A′ has affixed to it on each side of said wheel beveled pinions 1, meshing with horizontally-arranged bevel-gears 2, mounted on a cam-block 3, which carries a continuous spiral cam-groove 4. The shaft of the drive-wheel A′ has its bearings in the arms or portions $a$ of the frame, and the vertical shafts of the blocks 3 have bearings in the arms $a$ $a'$. The upper journal 5 of the block-shaft is conical or extended to a point at its end, as shown at 6, and this end has a bearing in the arm $a$. This journal is also provided with an annular channel 7, within which ball-bearings 8 engage, a portion of these ball-bearings 8 being within an annular groove 9, formed in the arm $a$. The annular channel 7 is shown as V-shaped in cross-section, and the annular groove 9 is shown substantially rectangular in cross-section, and one wall of said groove is formed by a removable block 10, engaging an interior screw-thread in the chamber formed for the bearing in the arm $a$. The lower journal 11 of the block-shaft is formed similarly to the journal 5, and similar ball-bearings are employed. The pointed end of this journal, however, engages with an adjustable block 12, here shown in the form of a screw, movable vertically in a tapped hole in the arm $a'$ in line with the shaft of the cam-block.

B B′ designate the operating-levers or foot-pedals arranged at opposite sides of the wheel A′ and having journal-bearings in the upright portions $a^4$ of the frame, as will be hereinafter more fully described, and having roller-bearings in curved guide-rods $b\ b'$, extended between the portions $a\ a'$ of the frame, and these levers also have roller-bearing connection with the cam-groove in the cam-blocks 3, and at these bearing-points it is very desirable to have as little friction as possible, and as the said bearings are similar for both levers I will confine my description to the bearings for one lever, which are more plainly shown in the enlarged views, Figs. 10, 10ª, and 11.

From the upper side of the lever B a journal-arm 13 extends upward and rearward, and from the lower side of said lever a journal-arm 14 extends downward and rearward, and the respective arms 13 14 have journaled on them antifriction-rollers 15 and 16. These for each roller consist of an inner sleeve comprising two segmental sections 17, and in this sleeve annular grooves 18 are formed, and the journal-arms are provided with annular grooves 19, and ball-bearings 20 are placed in these grooves. The several grooves 18 19 are shown as substantially V-shaped in cross-section. Surrounding the sleeve formed by the section 17 is the outer cylindrical shell of the roller, preferably having end flanges 21, which engage, respectively, the front and rear edges of the guide $b$ or $b'$. The outer shell is secured to the section 17 of the sleeve by means of screws 22. By this construction the ball-bearings may be put in place, that is, the said balls may be placed in the grooves formed in the journal-arms, then the two halves or sections of the sleeve placed over the same, and then the outer cylindrical shell may be slid over the sleeve and the screws inserted.

It will be seen that the rollers 15 and 16 are arranged eccentrically one with relation to the other, so that the roller 15 will bear only on the guide-rod $b$ and the roller 16 will bear only on the guide-rod $b'$. By so placing the rollers there will be no binding effect when the lever B is rocked on its pivot.

The end of the lever B is provided with an antifriction-roller 23 for engaging in the cam-groove 4 of the cam-block 3. This roller 23 comprises an outer shell or ring and annular blocks 24 25, which surround the journaled end of the lever B. The blocks 24 25 are made in sections or halves similar to the sleeve 17, heretofore described, and for the same purpose. The block 24 is shown as affixed by means of screws 25ª to the ring or shell of the roller 23, but the block 25 is designed to be moved longitudinally within said shell or ring and relatively to the annular block 24, for the purpose of adjusting the annular grooves 26 27 in said blocks relatively to annular bearing-grooves 28, formed in the journal end of the lever B, and within which grooves bearing-balls 29 are placed. To cause adjustment of the block 25, I employ screw-rods 30, which extend transversely through holes in the annular block 24 and have a screw-thread engagement with the annular block 25.

I will now describe a pivot or fulcrum mechanism for the levers B B′, referring particularly to Figs. 2, 3, 4, 5, and 9. The upright portion $a^4$ of the frame of the bicycle is provided with a transverse recess 31, and a plate 32, adapted to be secured thereon by means of screws or otherwise, is also provided with a transverse recess, so that when the plate 32 is secured to the upright $a^4$ a transverse opening is formed for the passage of the operating-lever. The outer wall of the recess 31 is provided with arc-shaped slots 33 34, and the plate 32 is provided with similarly-shaped openings or slots. Blocks 35 36 are secured to the respective sides of the lever B, and these blocks are shown as wedge-shaped in cross-section with their knife-edges in line with the axis of the fulcrum-point of the lever, and these knife-edges bear upon blocks 37, which are integral with the upright $a^4$ of the frame. The knife-edges of the blocks 35 36 in all cases are preferably of ordinary steel, and the blocks upon which they oscillate are also of steel or faced with steel. By this construction it will be seen that there is a very narrow fulcrum-bearing for the operating-lever, and therefore the resistance or friction is reduced to a minimum.

To prevent an upward movement of the lever during its rocking operation, I attach to it knife-edged bearing-blocks 38, adapted to engage at their edges with the under side or point of blocks 39, attached to the upright portion $a^4$ of the frame. The blocks 37 39, at each side of the lever, are arranged with the blocks 37 within the vertical plane of the blocks 39, and their apexes are of course on the same horizontal plane and in line with the axis of the lever. The knife-edged bearing-blocks 38 are removably secured to the lever by means of a screw 40, and their base portions are in the form of flanges extended inward through the arc-shaped slot 34.

To prevent a lateral movement of the operating-lever relatively to the upright portion $a^4$ of the frame, I provide brackets 41, which are secured to the frame and extend upward and at their upper ends have adjustable bearing-points 42, which engage against fingers 43, extended downward from the lever, as plainly shown in Fig. 9.

Referring now to the modification shown in Figs. 6, 7, and 8, the lever B has at its upper portion laterally-extended bearing-blocks 44, which are similar in shape to the bearing-blocks heretofore described and engage in the apex of openings 45, formed in the parts 31 32, and in this example of my improvement as a means of preventing an upward movement of the operating-lever B, I provide antifriction-rollers 46, which are placed in a recess 47, formed in the top or wide portion of the bearing-block 44 and adapted to engage with the wall at the top of the openings 45. It will be seen that normally the rollers 46 do not engage with the said wall of the opening 45, but there is a provision for a slight upward motion of the shaft, thereby obviating any tendency of the balls or rollers 46 to cause friction or binding of the parts.

I provide means for cushioning the operating-lever at the end of its extreme downward stroke, so as to prevent a jarring or an abrupt termination of the stroke. In Fig. 2 this means is shown as a spring 48, extended from the part $a^4$ and with which the lever is adapted to engage. In Fig. 6 this means is shown as a cushion 49, of yielding material, such, for instance, as rubber, secured in a socket formed in the end of an arm 50, extended rigidly from the part $a^4$. To prevent a lateral movement of the lever in the example of my improvement shown in Figs. 6 and 8, I employ ball-rollers 51, seated in recesses 52, formed in the inner side of the parts $a^4$ and 32 of the upright and bearing slightly against the sides of the lever. It may be here stated that I employ the separable piece 32, as shown in the examples of my improvement above described, to provide an easy means of inserting the lever and the several bearing-balls.

Referring now to the example of my improvement shown in Figs. 20, 21, and 22, the lever B is provided with wedge-shaped bearing-blocks 53, arranged one at each side of the lever and extended with their knife-edges in line with the axis of the fulcrum-point of the lever and bearing in the apex of recesses 54, formed in the top of the transverse shaft 55. These recesses are V-shaped in cross-section, and the knife-edges of the blocks engage in the apex of the recesses. Between the recesses 54 the shaft is provided with an upwardly-extended knife-edged bearing-block 56, which passes into a recess 56ᵃ, V-shaped in cross-section and formed in the lever B, between the blocks 53. The lever B is provided with another block 57, extended upward from the lower wall of the opening through the lever into a V-shaped recess 58, formed in the shaft 55 at the lower side, opposite the block 56.

It will be observed that the blocks 53 form a fulcrum for the lever B, and the block 57 on the lever, projecting in the opposite direction from the blocks 53 and bearing against the apex of the recess 58 in the shaft 55, will prevent an upward movement of the lever relatively to the shaft, and to prevent a lateral movement of the lever on the shaft bearing-points 59, of hardened material—such, for instance, as steel—are secured to the sides of the lever and adapted to engage their points against the outer walls of the recesses 54. In this example, as a means for placing the parts in operative connection, the lever B is provided at its under side with a removable block 60, forming one half of the bearing portion of the lever.

The example of my improvement shown in Figs. 23, 24, and 25 is quite similar to the construction first described as relates to the location of the bearings; but in this case the bearing-blocks 61, which engage in recesses formed in the shaft 55, are secured to the lever by means of screws 62, and the block 63, for preventing an upward movement of the lever, is also secured to the lever by means of screws 64. For preventing a lateral movement of the lever in this example collars 65 are rigidly attached to the shaft 55 at each side of the lever, and these collars are provided with annular grooves 66, in which bearing-balls 67 are loosely placed and adapted to engage with the sides of the lever.

In the examples of my improvement heretofore described the driving power of the drive-wheel is located on each side of said wheel. In the example shown in Figs. 13 and 14, however, I provide such driving power on one side only of the wheel, and also in this example there is a modified construction of the bearing points or blocks of the operating-lever C, which has connection with the cam-block 3, which is similar in construction to the cam-block heretofore described.

The operating-lever C is rigidly mounted on a rock-shaft 68, having bearings in the upright $a^4$ of the frame, and another operating-lever C' is loosely fulcrumed on said rock-shaft 68 at the side of the machine opposite the lever C. This lever C' has a short rearward extension 69.

70 is a vertically-reciprocating rod having a vertically-elongated opening 71 in its central portion surrounding the shaft 68, and its ends are designed to pass loosely through guide-openings in guide-fingers 72, rigidly attached to the frame of the machine. At its opposite ends this rod 70 is provided with bearing-blocks 73 74, which are provided with recesses 75, V-shaped in cross-section. The rearwardly-extended end 69 of the lever C' is provided with a similarly-shaped recess 76, and within this recess 76 the knife-edge end of a rod 78 engages, and the upper knife-edged end of the rod 78 engages within the recess 75 of the block 74 on the rod 70. From the block 73 on the rod 70 a rod 79, similar to the rod 78, extends upward and engages with its upper end in a recess formed in an arm 80, extended rigidly from the rock-shaft 68.

It will be seen by this construction that when the forward end of the lever C is forced downward its rear end will of course be moved upward to rotate the cam-block 3, and during this motion the rod 70 will be moved downward, causing the pressure end of the lever C' to be moved upward through the agency of the rod 78, which engages with the projection 69 of the said lever on the side of the shaft 68 opposite that of the arm 80, with which the rod 79 engages.

From the above description it will be seen that the two levers C C' will be perfectly balanced and the knife-edged bearings will provide for a very small amount of friction. The rods 78 79 are in effect bearing-blocks similar to those heretofore described.

In the example of my improvement shown in Figs. 16, 17, and 18 an operating-lever $C^2$ is adapted to engage with the driving-cam block 3, and the opposite lever $C^3$ is loosely mounted on a shaft 81, to which the lever $C^2$ is rigidly attached. This shaft 81 has bearings in the side frames or rails of the machine. The lever $C^2$ is provided with a segmental bevel-gear 82, meshing with a bevel segmental gear 83 on one end of an arm 84, extended horizontally and having a bearing on a stud from a yoke 85, supported on the machine-frame. The opposite end of the arm 84 is provided with a segmental bevel-gear 86, meshing with a segmental gear 87, attached to the lever $C^3$. Obviously in this example when the foot end of the lever $C^2$ is forced downward to rotate the cam-block 3 the foot end of the lever $C^3$ will be rocked upward through the agency of the segmental gears just described, and when the lever $C^3$ is forced upward by pressure the lever $C^2$ will be rocked in the opposite direction, thus causing a constant rotary motion of the block 3.

In the modification shown in Fig. 19 a lever 88 is shown having a roller connection with the cam-block 3, in the manner as heretofore described, and at its opposite end this lever 88 is provided with a segmental gear 89, engaging with a segmental gear 90 on the foot-lever 91, and a segmental gear 92 on a foot-lever 93 also engages with the segment 90. By this construction it will be seen that when the lever 91 is rocked downward the end of the lever 88, engaging with the cam-block, will also be rocked downward and the free end of the lever 93 will be rocked upward, and then of course the reverse action will take place as the foot-lever 93 is rocked downward.

Having thus described my invention, I claim as new and desire to secure by Letters Patent—

1. In a bicycle, a cam-block having a spiral cam-groove, a foot-operated lever, antifriction-rollers carried on the said lever, the said antifriction-rollers having their axes arranged in different vertical and different horizontal planes, each roller comprising an outer shell, two segmental sections within said shell, bearing-rollers movable in grooves formed in said segmental sections and also in grooves on the supporting-bars extended from the foot-lever, and a guide for each of said antifriction-rollers, substantially as specified.

2. In a bicycle, a cam-block, a foot-lever engaging therewith, antifriction-rollers journaled on portions projecting from said lever, the said antifriction-rollers having their axes arranged in different vertical planes and also in different horizontal planes, and a guide-track for each of said antifriction-rollers, substantially as specified.

3. In a bicycle, a foot-lever having a fulcrum comprising a portion of the frame provided with recesses substantially V-shaped in cross-section and having their apexes at the ends of the fulcrum of the lever, bearing-blocks removably secured to the foot-lever and having knife-edged bearings in the apex of the said recesses, means for preventing a vertical movement of the lever relatively to the frame, and adjustable bearing-points for preventing a lateral movement of said lever, substantially as specified.

4. In a bicycle, a foot-lever, knife-edged bearing-blocks on said lever, recesses in the frame in which said blocks engage, bearing-blocks rigidly mounted on the frame and engaging in recesses formed in the lever, for preventing an upward movement of the lever relatively to the frame, and adjustable bearing-points for preventing the lateral movement of the lever relatively to the frame, substantially as specified.

5. In a bicycle, a spirally-grooved block having gear connections with the drive-wheel of a machine, a fulcrumed foot-lever having an engagement in said spiral groove, a second foot-lever having operative connection with the first-named foot-lever, upwardly and rearwardly extended arms on said first-named foot-lever arranged respectively at the upper and lower sides thereof, the axes of the horizontal portions of said arms being arranged in different vertical planes, antifriction-rollers mounted on said arms, and guides secured to the frame upon which said rollers move, substantially as specified.

6. In a bicycle, a frame provided with a transverse recess, a plate removably secured to the frame and having a transverse recess registering with the recess of the frame, a lever, knife-edged bearing-blocks on the lever having bearings on blocks on the frame, brackets extended from the frame, adjustable bearing-points on said brackets and fingers extended from the frame and against which said points engage, substantially as specified.

DETALMO DI BRAZZA SAVORGNAN.

Witnesses:
C. R. FERGUSON,
C. SEDGWICK.